Bart Kane.
Water Prism.

No. 71309. Patented Nov 26 1867.

Attest.
James H. Layman
C. H. Eckles

Inventor.
Bart Kane
By Knight Bros
Attys.

United States Patent Office.

BART KANE, OF CINCINNATI, OHIO.

*Letters Patent No. 71,309, dated November 26, 1867.*

---

IMPROVEMENT IN WATER-PRISMS.

---

*The Schedule referred to in these Letters Patent and making part of the same.*

---

TO ALL WHOM IT MAY CONCERN:

Be it known that I, BART KANE, of Cincinnati, Hamilton county, State of Ohio, have invented new and useful Improvements in Water-Prisms; and I do hereby declare the following to be a full, clear, and exact description thereof, reference being had to the accompanying drawings, making part of this specification.

My invention relates to a cheap, simple, and easily-manufactured form of water-prisms, and one which permits of the prisms being emptied and cleaned in a few moments, when they have become dull and opaque by the sedimentary deposits of the water. In the accompanying drawing—

Figure 1:
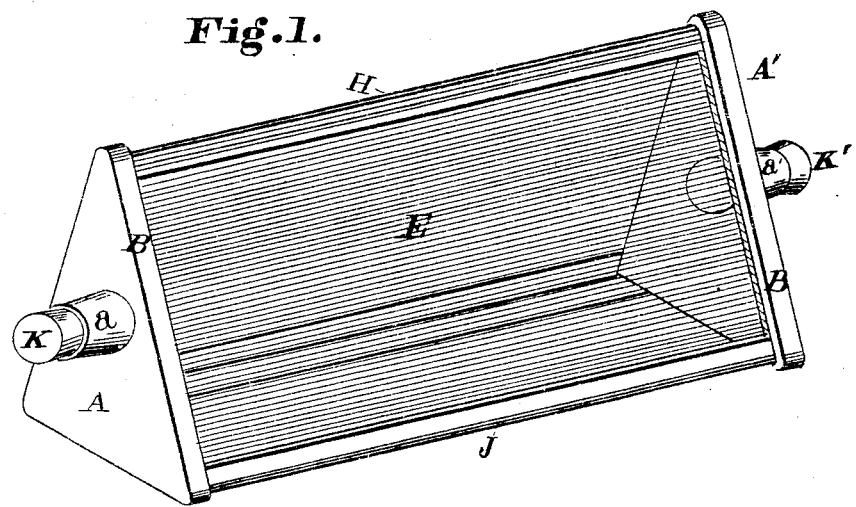
Figure 1 is a perspective view of a water-prism embodying my improvements.
Figure 2:
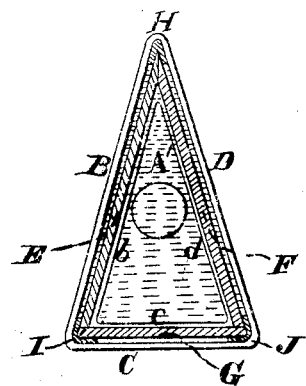
Figure 2 is a transverse vertical section of the same when filled with water.
Figure 3:
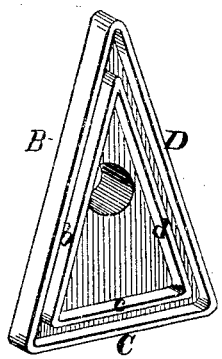
Figure 3 is a perspective view of one of the flanged plates used in constructing the ends of the prisms.

The plates A A', which form the ends of the prisms, are provided with exterior flanges B C D, and interior ones, $b\ c\ d$, and these flanges serve to confine in their proper positions the glass or other transparent plates E F G. The plates E F G form the sides of the prism, and these plates may be of any desired length or width, so as to suit prisms of any dimensions. The ends of these plates are inserted between the flanges B C D $b\ c\ d$, and the joints so formed are rendered water-tight by filling in with white lead or other suitable cement. This cement is indicated in the drawing with red ink. The edges of the glass plates E F G are retained under sheet-metal strips H I J, whose ends are soldered to the flanged end plates A A', and, if found necessary, cement may be employed between the sheet-metal strips and glass plates. Projecting outwardly from the flanged plates A A' are tubes or necks $a\ a'$, for the reception of cork or other stoppers, K K', which retain the water or other fluid within the prism when it is filled. The provision of the two necks enables the prism to be cleaned more readily than if only one were used, but a single neck may be employed without impairing the efficiency of the instrument.

This instrument, besides being an interesting and amusing toy, is also valuable as a philosophical apparatus, by which to demonstrate the nature of light, laws of reflection, refraction, &c.

This instrument can be furnished much cheaper than a solid glass prism of the same dimensions could be, and after being used the water can be poured out, and need not be filled until is is again desired to renew the experiments.

I claim herein as new, and of my invention—

1. A water-prism consisting of the flanged end plates A A', B C D, $b\ c\ d$, glass plates E F G, metallic binding-strips H I J, and one or more necks, $a$, for the insertion of stoppers K, the whole being arranged and operating substantially as herein described and for the purpose explained.

2. I also claim the triangular-shaped and double flanged plate A B C D $b\ c\ d$, when provided with the neck $a$, for the object stated.

In testimony of which invention I hereunto set my hand.

BART KANE.

Witnesses:
GEO. H. KNIGHT,
JAMES H. LAYMAN.